(12) United States Patent
Ruan et al.

(10) Patent No.: US 11,812,185 B2
(45) Date of Patent: Nov. 7, 2023

(54) VIDEO CONFERENCING SYSTEM AND METHOD OF REMOVING INTERRUPTION THEREOF

(71) Applicant: Acer Incorporated, New Taipei (TW)

(72) Inventors: Yu-Shan Ruan, New Taipei (TW);
Ling-Fan Tsao, New Taipei (TW);
Shu-Chun Liao, New Taipei (TW);
Sheng-Hsin Fan, New Taipei (TW);
Yu-Chieh Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 135 days.

(21) Appl. No.: 17/463,561

(22) Filed: Sep. 1, 2021

(65) Prior Publication Data
US 2022/0141396 A1    May 5, 2022

(30) Foreign Application Priority Data

Oct. 29, 2020    (TW) .................... 109137675

(51) Int. Cl.
| | | |
|---|---|---|
| *H04N 5/272* | (2006.01) | |
| *H04N 5/262* | (2006.01) | |
| *H04M 3/56* | (2006.01) | |
| *G06F 3/16* | (2006.01) | |
| *G06V 20/40* | (2022.01) | |
| *G06V 40/16* | (2022.01) | |
| *G06F 18/214* | (2023.01) | |
| *G06V 20/52* | (2022.01) | |

(52) U.S. Cl.
CPC ............. *H04N 5/272* (2013.01); *G06F 3/165* (2013.01); *G06F 18/214* (2023.01); *G06V 20/46* (2022.01); *G06V 20/52* (2022.01); *G06V 40/172* (2022.01); *H04M 3/567* (2013.01); *H04N 5/2621* (2013.01)

(58) Field of Classification Search
CPC .......... H04N 7/15; H04N 7/152; H04N 7/147; H04N 5/272; H04N 5/2621; G06V 10/82; G06V 20/46; G06V 20/52; G06V 40/172
See application file for complete search history.

(56) References Cited

U.S. PATENT DOCUMENTS

| | | | |
|---|---|---|---|
| 6,590,601 B2 * | 7/2003 | Sukeno | H04N 7/147 348/14.07 |
| 7,564,476 B1 * | 7/2009 | Coughlan | H04N 7/147 348/14.08 |
| 7,657,171 B2 * | 2/2010 | Sundstrom | G03B 13/30 348/348 |

(Continued)

FOREIGN PATENT DOCUMENTS

| | | |
|---|---|---|
| CN | 102843543 | 12/2012 |
| CN | 111556278 | 8/2020 |

*Primary Examiner* — Jason A Flohre
(74) *Attorney, Agent, or Firm* — JCIPRNET (57) ABSTRACT

A video conferencing system and a method of removing an interruption thereof are provided. The method includes the following steps. A video conference is activated and a video stream is obtained through an image capturing device. A deep learning model is used to detect at least one first image object in a first video frame of the video stream. Whether the at least one first image object is an interruption object is determined. The at least one first image object is removed from the first video frame in response to the at least one first image object being determined to be the interruption object.

15 Claims, 9 Drawing Sheets

(56) References Cited

U.S. PATENT DOCUMENTS

| | | | | |
|---|---|---|---|---|
| 7,720,283 B2 * | 5/2010 | Sun | G06V 10/28 | |
| | | | 382/173 | |
| 7,783,075 B2 * | 8/2010 | Zhang | H04N 7/147 | |
| | | | 382/173 | |
| 7,911,513 B2 * | 3/2011 | Garrison | H04N 7/14 | |
| | | | 348/239 | |
| 8,044,989 B2 * | 10/2011 | Mareachen | H04N 7/147 | |
| | | | 348/14.08 | |
| 8,305,448 B2 * | 11/2012 | Yoda | H04N 23/611 | |
| | | | 348/211.1 | |
| 8,355,039 B2 * | 1/2013 | Michrowski | H04N 7/147 | |
| | | | 709/204 | |
| 8,363,085 B2 * | 1/2013 | Michrowski | H04N 23/815 | |
| | | | 709/204 | |
| 8,462,191 B2 * | 6/2013 | DeGrazia | H04N 7/147 | |
| | | | 348/14.09 | |
| 8,633,961 B2 * | 1/2014 | Jung | H04N 7/147 | |
| | | | 348/14.02 | |
| 9,041,765 B2 * | 5/2015 | Periyannan | H04N 7/141 | |
| | | | 348/14.02 | |
| 9,083,850 B1 * | 7/2015 | Higgs | H04N 7/147 | |
| 9,124,762 B2 * | 9/2015 | Cutler | H04N 7/15 | |
| 9,232,189 B2 * | 1/2016 | Shaburov | H04N 7/152 | |
| 9,282,285 B2 * | 3/2016 | Winterstein | H04N 7/141 | |
| 9,313,454 B2 * | 4/2016 | Lalonde | H04N 7/15 | |
| 9,350,940 B1 * | 5/2016 | Baker | H04N 7/141 | |
| 9,497,413 B2 * | 11/2016 | Chougle | H04N 7/15 | |
| 9,503,685 B2 * | 11/2016 | Baron, Jr. | G09G 5/14 | |
| 9,679,194 B2 * | 6/2017 | Ra | G06T 5/002 | |
| 9,729,824 B2 * | 8/2017 | Cutler | H04N 23/80 | |
| 9,911,193 B2 * | 3/2018 | Eliraz-Levonai | G06T 7/246 | |
| 9,948,893 B2 * | 4/2018 | Barzuza | H04L 65/403 | |
| 10,116,901 B2 * | 10/2018 | Shaburov | H04N 7/15 | |
| 10,440,324 B1 * | 10/2019 | Lichtenberg | H04L 12/1827 | |
| 10,586,070 B2 * | 3/2020 | Cai | G06T 11/60 | |
| 10,628,922 B2 * | 4/2020 | Ra | G06V 10/42 | |
| 10,776,073 B2 * | 9/2020 | Lenke | H04N 7/152 | |
| 10,819,950 B1 * | 10/2020 | Lichtenberg | G06N 7/01 | |
| 10,924,761 B2 * | 2/2021 | Edpalm | H04N 19/593 | |
| 11,182,879 B1 * | 11/2021 | Haslam | G06V 40/172 | |
| 11,184,582 B2 * | 11/2021 | Ahn | H04N 7/15 | |
| 11,190,735 B1 * | 11/2021 | Trim | G06V 20/52 | |
| 11,206,362 B2 * | 12/2021 | Ahn | G06T 5/002 | |
| 11,252,374 B1 * | 2/2022 | Lichtenberg | G10L 19/018 | |
| 11,290,682 B1 * | 3/2022 | Shaburov | H04N 7/15 | |
| 11,303,465 B2 * | 4/2022 | Trim | H04L 12/1831 | |
| 11,323,659 B2 * | 5/2022 | Ahn | G06N 3/04 | |
| 11,343,412 B2 * | 5/2022 | Sreepathihalli | H04N 5/2226 | |
| 11,350,059 B1 * | 5/2022 | Swierk | G06T 7/0002 | |
| 11,386,562 B2 * | 7/2022 | Chiang | G06F 3/0482 | |
| 11,392,709 B2 * | 7/2022 | Varerkar | G06F 21/62 | |
| 11,394,922 B2 * | 7/2022 | Ahn | H04N 21/454 | |
| 11,425,335 B2 * | 8/2022 | Lemes da Silva | G06F 21/84 | |
| 11,450,095 B2 * | 9/2022 | Anderton-Yang | G06V 10/82 | |
| 11,587,206 B2 * | 2/2023 | Ra | G06V 10/761 | |
| 2007/0153091 A1 * | 7/2007 | Watlington | H04N 21/4223 | |
| | | | 348/208.14 | |
| 2008/0303949 A1 * | 12/2008 | Ciudad | H04N 9/74 | |
| | | | 348/E9.055 | |
| 2012/0327172 A1 * | 12/2012 | El-Saban | G06T 7/174 | |
| | | | 348/14.02 | |
| 2014/0362163 A1 * | 12/2014 | Winterstein | H04N 7/141 | |
| | | | 348/14.07 | |
| 2017/0148487 A1 * | 5/2017 | Krishnakumar | H04N 7/147 | |
| 2017/0351485 A1 * | 12/2017 | Kohler | A63F 13/211 | |
| 2018/0053043 A1 * | 2/2018 | Lawrence | H04N 7/15 | |
| 2018/0091856 A1 * | 3/2018 | Ayers | H04N 21/4542 | |
| 2019/0147175 A1 * | 5/2019 | Varerkar | G06V 10/764 | |
| | | | 726/26 | |
| 2021/0287007 A1 * | 9/2021 | Wang | G06V 40/41 | |
| 2021/0329338 A1 * | 10/2021 | Khov | G06V 20/49 | |
| 2022/0036708 A1 * | 2/2022 | Rey | H04N 7/15 | |
| 2022/0239513 A1 * | 7/2022 | Swierk | G06V 40/18 | |
| 2022/0239848 A1 * | 7/2022 | Swierk | G06T 5/002 | |
| 2022/0256116 A1 * | 8/2022 | Chu | H04N 23/661 | |
| 2022/0350925 A1 * | 11/2022 | Alexander | G06V 40/166 | |

* cited by examiner

VIDEO CONFERENCING SYSTEM AND METHOD OF REMOVING INTERRUPTION THEREOF

CROSS-REFERENCE TO RELATED APPLICATION

This application claims the priority benefit of Taiwan application serial no. 109137675, filed on Oct. 29, 2020. The entirety of the above-mentioned patent application is hereby incorporated by reference herein and made a part of this specification.

BACKGROUND

Technical Field

This disclosure relates to a video conferencing system, and in particular to a video conferencing system and a method of removing an interruption thereof.

Description of Related Art

With the outbreak of the COVID-19 pandemic across the world, the demand for using video conferencing to work or attend online courses remotely at home has increased dramatically. During the process of video conferencing, unexpected interruptions may sometimes occur in the surroundings of the user and affect the video conference. For example, at home, family members or pets may intrude into the background of the video conference without paying attention to cause an image interruption, or children or pets giving out interfering noise suddenly to affect the video conference.

SUMMARY

This disclosure provides a video conferencing system and a method of removing an interruption thereof, which can remove an interruption of the video conference as soon as possible without affecting other conference participants.

An embodiment of the disclosure provides a method of removing an interruption, which is applicable to a video conferencing system and includes the following steps. A video conference is activated and a video stream is obtained through an image capturing device. A deep learning model is used to detect at least one first image object in a first video frame of the video stream. Whether the at least one first image object is an interruption object is determined. The at least one first image object is removed from the first video frame in response to the at least one first image object being determined to be the interruption object.

An embodiment of the disclosure provides a video conferencing system, which includes a monitor, an image capturing device, a storage device, and a processor. The processor is coupled to the monitor, the image capturing device and the storage device, and is configured to execute the following steps. A video conference is activated and a video stream is obtained through the image capturing device. A deep learning model is used to detect at least one first image object in a first video frame of the video stream. Whether the at least one first image object is an interruption object is determined. The at least one first image object is removed from the first video frame in response to the at least one first image object being determined to be the interruption object.

Based on the above, in the embodiment of the disclosure, when there is an interruption in the surroundings of the user, the video conferencing system may automatically detect the presence of the interruption object in the video frame, and then eliminate the interruption object that is in the video frame. Based on this, the interruption in the video conference may be removed immediately, thereby improving the fluency of the video conference.

To make the aforementioned more comprehensible, several embodiments accompanied with drawings are described in detail as follows.

DESCRIPTION OF THE EMBODIMENTS

Some embodiments of the disclosure accompanied with drawings are described in detail as follows. The reference numerals in the following description are regarded to represent the same or similar elements when the same reference numeral appears in the different drawings. These embodiments are only a part of the disclosure, and do not disclose all possible implementation manners of the disclosure. More precisely, these embodiments are just examples of the methods and systems of the disclosure that are within the scope of the patent application.

Figure 1:
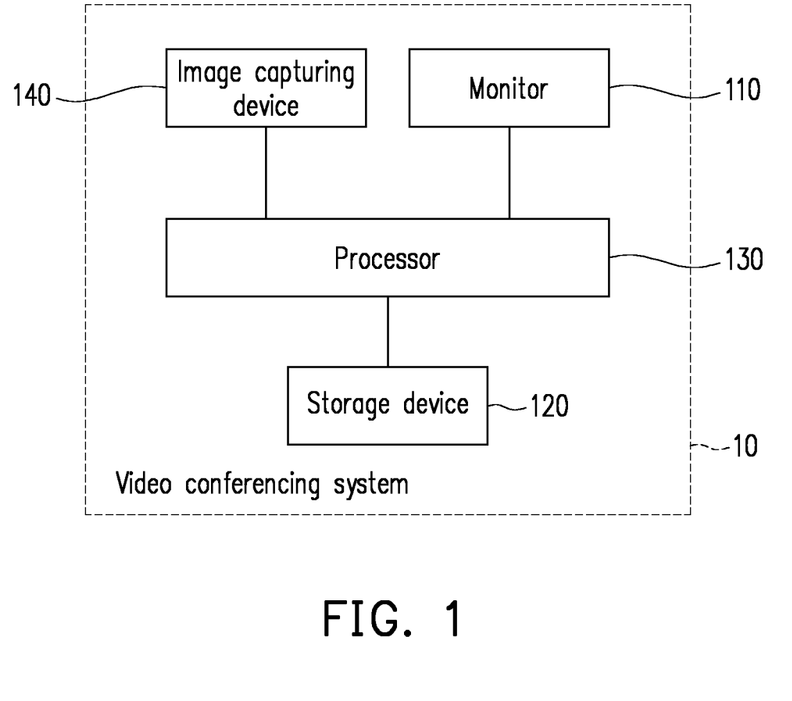
FIG. 1 is a block diagram of a video conferencing system according to an embodiment of the disclosure.

FIG. 1 is a block diagram of a video conferencing system according to an embodiment of the disclosure. With reference to FIG. 1, a video conferencing system 10 includes a monitor 110, a storage device 120, a processor 130, and an image capturing device 140. The processor 130 is coupled to the monitor 110, the storage device 120, and the image capturing device 140. In some embodiments, the video conferencing system 10 may be implemented as a computer system having the monitor 110, the storage device 120, and the processor 130, with the image capturing device 140 externally connected to the computer system. For example, the video conferencing system 10 may be composed of a notebook computer or a desktop computer with an external camera, but the disclosure is not limited thereto. In some embodiments, the video conferencing system 10 may be implemented by integrating the monitor 110, the storage device 120, the processor 130, and the image capturing device 140 into a single electronic device. For example, the video conferencing system 10 may be implemented as an electronic device with an image capturing function such as a smart phone, a tablet computer, or a notebook computer, but the disclosure is not limited thereto.

The monitor 110 may be a liquid crystal monitor (LCD), a light-emitting diode (LED) monitor, an organic light-emitting diode (OLED) or other types of monitors, but the disclosure is not limited thereto.

The storage device 120 is configured to store data such as a file, an image, a command, a program code, or a software element. The storage device 120 may be, for example, any type of fixed or removable random access memory (RAM), a read-only memory (ROM), a flash memory, a hard disk or other similar devices, an integrated circuit, or a combination thereof.

The image capturing device 140 is configured to shoot a frame to generate a video stream, and includes a camera lens having a lens and a photosensitive element. The photosensitive element is configured to sense an intensity of a light entering the lens to generate an image. The photosensitive element may be, for example, a charge coupled device (CCD), a complementary metal-oxide semiconductor (CMOS) element or other elements, but the disclosure is not limited thereto.

The processor 130 is coupled to the monitor 110, the storage device 120, and the image capturing device 140 to control the overall operation of the video conferencing system 10. The processor 130 may be a central processing unit (CPU), or other programmable general-purpose or special-purpose microprocessor, a digital signal processor (DSP), a programmable controller, an application specific integrated circuit (ASIC), a programmable logic device (PLD), or other similar devices, or a combination of these devices. The processor 130 may execute a program code, a software module, an instruction, etc., recorded in the storage device 120 to implement the method of removing the interruption according to the embodiment of the disclosure.

Figure 2:
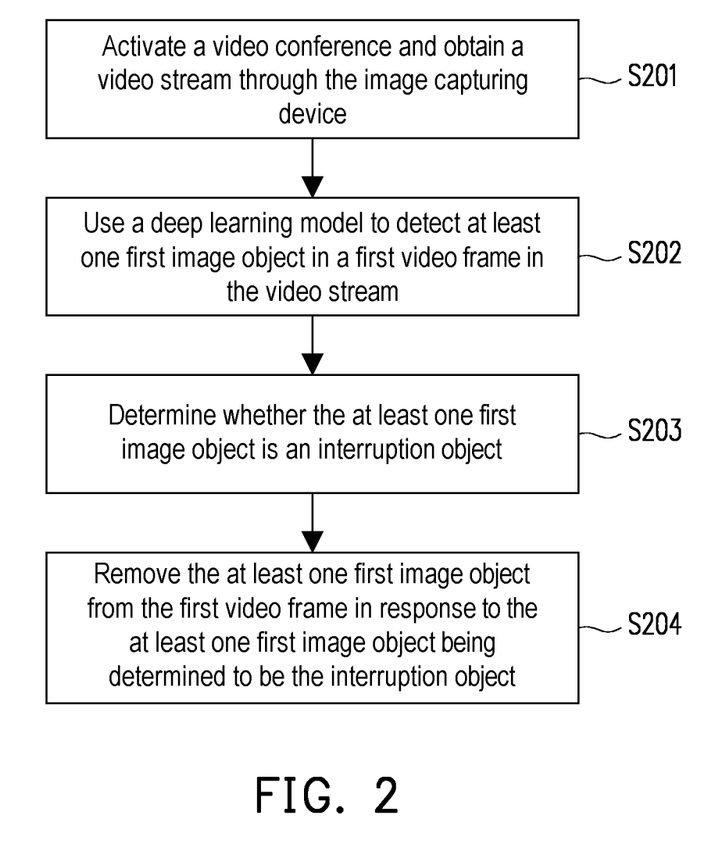
FIG. 2 is a flowchart of a method of removing an interruption according to an embodiment of the disclosure.

FIG. 2 is a flowchart of a method of removing an interruption according to an embodiment of the disclosure. With reference to FIG. 2, the method according to this embodiment is applicable to the video conferencing system 10 in the above-mentioned embodiment. Detailed steps of this embodiment are described in conjunction with various elements in the video conferencing system 10 as follows.

In Step S201, the processor 130 activates a video conference and obtains a video stream through the image capturing device 140. The processor 130 may activate the video conference by executing a video conferencing software, and the monitor 110 may display an user interface of the video conferencing software. During the video conference, the image capturing device 140 continuously captures images to generate the video stream. The image capturing device 140 may provide the video stream to a computer system composed of the processor 130 and the storage device 120. The video stream may include multiple video frames respectively corresponding to different time points. The processor 130 may continuously provide a video frame including the user to other conference participants via the Internet.

In Step S202, the processor 130 uses a deep learning model to detect at least one first image object in a first video frame in the video stream. The deep learning model is configured to carry out object detection. The deep learning model may be a Convolution Neural Network (CNN) model configured to carry out object detection such as a R-CNN, a Fast R-CNN, a Faster R-CNN, a YOLO, or a SSD, but the disclosure does not limit the network architecture used by the deep learning model. In detail, after the image capturing device 140 captures the current video frame (that is, the first video frame), the processor 130 may use the deep learning model to detect and identify one or more first image objects corresponding to at least one object classification result. For example, the processor 130 may use the deep learning model to detect the one or more first image objects classified as a "person" in the current video frame. In other words, the processor 130 may also detect the multiple first image objects corresponding to the different object classification results in the current video frame through the deep learning model.

In Step S203, the processor 130 determines whether the at least one first image object is an interruption object. In detail, in an embodiment, after obtaining the first image object in the current video frame (that is, the first video frame), the processor 130 may use another deep learning model to directly identify whether all of the first image objects are interruption objects to determine whether the current video frame includes an interruption object. In an embodiment, after obtaining the first image object in the current video frame (that is, the first video frame), the processor 130 may determine whether the current video frame includes an interruption object by comparing an image object in the current video frame with the image object in a previous video frame.

In Step S204, the processor 130 removes the at least one first image object from the first video frame in response to the at least one first image object being determined to be the interruption object. Therefore, the processor 130 may provide the first video frame without the interruption object to the other conference participants, so that the other conference participants in the video conference will not see the interruption object. It should be noted that, in some embodiments, after determining that the at least one first image object is the interruption object, the processor 130 may further remove the interruption object in other video frames captured after the first video frame according to positional information of the first image object.

In an embodiment, the processor 130 may replace the first video frame with the video frame that does not has the interruption object, so as to remove the interruption object. For example, the processor 130 may replace the first video frame with a video frame that is captured 3 seconds ago in response to the first video frame being determined to include the interruption object. Alternatively, in an embodiment, the processor 130 may remove the interruption object from the first video frame through various image processing techniques, such as covering the interruption object with a preset pattern, or blurring the interruption object. Or, in an embodiment, the processor 130 may use a first region of a third video frame to replace a second region of the first video frame that includes the interruption object, so as to remove the interruption object. The third video frame may be a background frame shot before the start of the video conference. Alternatively, the third video frame may also be a video frame captured before the first video frame.

Figure 3:
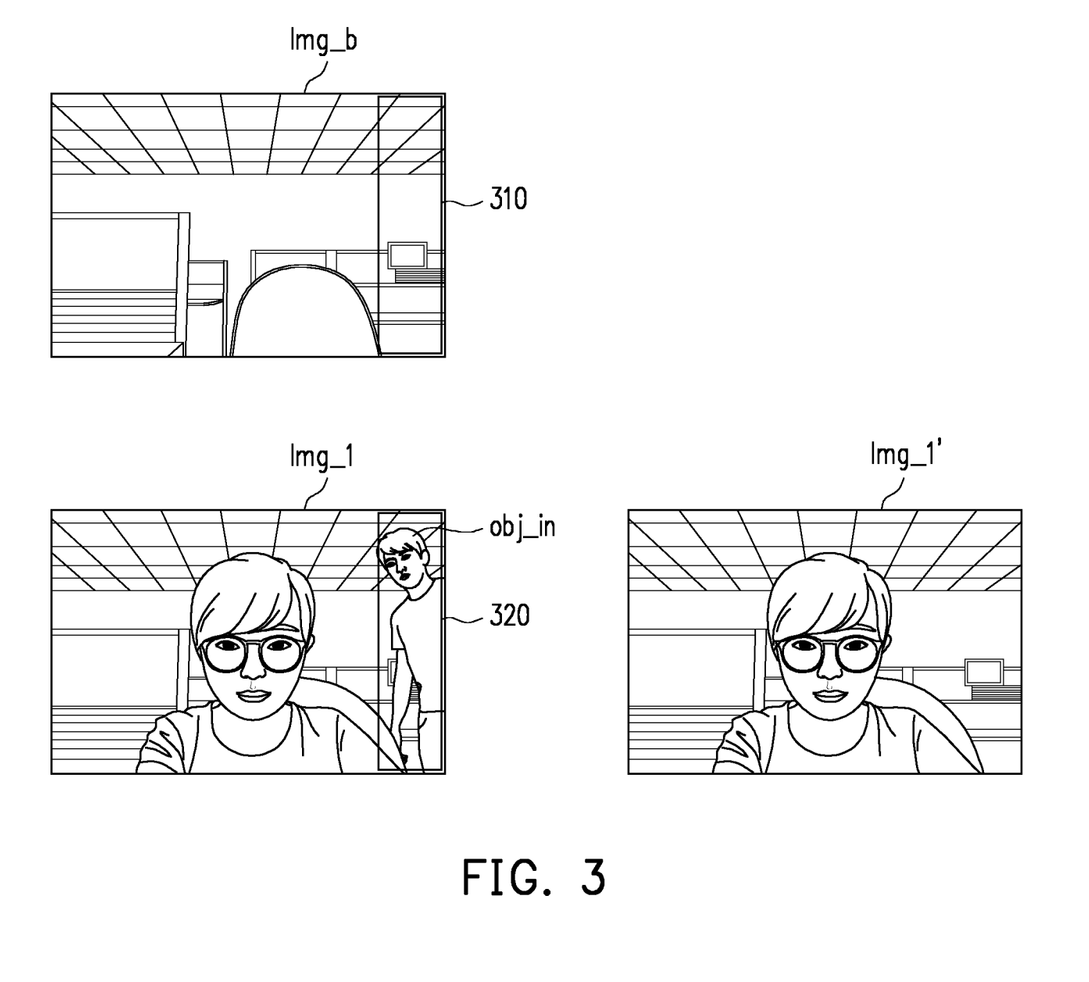
FIG. 3 is a schematic diagram of removing an interruption object according to an embodiment of the disclosure.

For example, FIG. 3 is a schematic diagram of removing an interruption object according to an embodiment of the disclosure. With reference to FIG. 3, the processor 130 may use a first region 310 of a background frame Img_b to replace a second region 320 of a first video frame Img_1 including an interruption object Obj_in to generate a processed first video frame Img_1'. In some embodiments, a size and a position of the second region 320 including the interruption object Obj_in may be decided by a bounding box provided by the deep learning model, and then a size and a position of the first region 310 are obtained.

Based on the foregoing, it can be known that the processor 130 may determine whether the first image object in the first video frame is the interruption object through different determination mechanisms. Several embodiments are respectively listed and described as follows.

Figure 4:
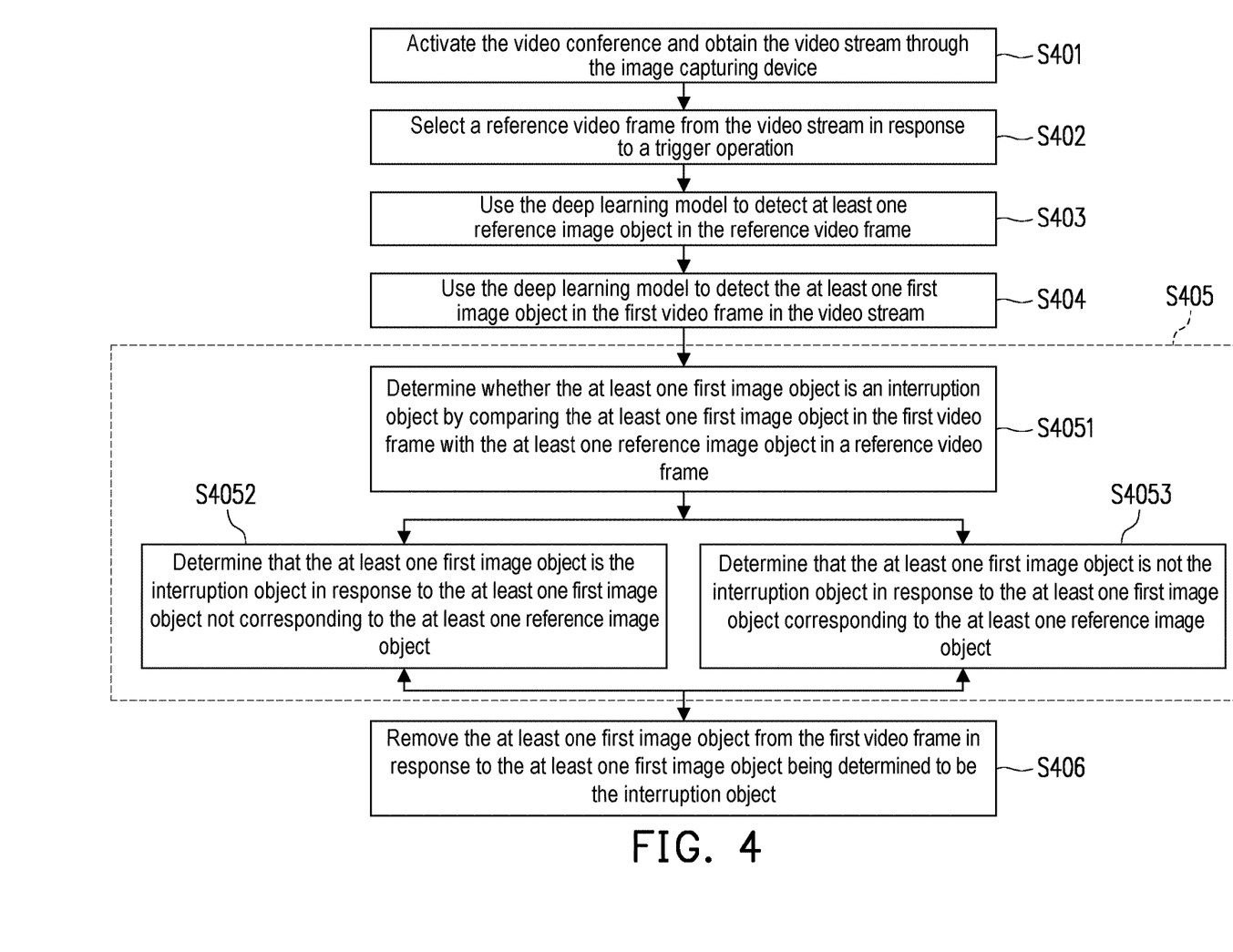
FIG. 4 is a flowchart of a method of removing an interruption according to an embodiment of the disclosure.

FIG. 4 is a flowchart of a method of removing an interruption according to an embodiment of the disclosure. With reference to FIG. 4, the method according to this embodiment is applicable to the video conferencing system 10 of the above-mentioned embodiment. Detailed steps of this embodiment are described in conjunction with the various elements in the video conferencing system 10 as follows.

In Step S401, the processor 130 activates the video conference and obtains the video stream through the image capturing device 140. In Step S402, the processor 130 selects a reference video frame from the video stream in response to a trigger operation. Next, in Step S403, the processor 130 uses the deep learning model to detect at least one reference image object in the reference video frame. In detail, the trigger operation may be a user input operation, and the user may activate the video conferencing system 10 to execute an anti-interference function through the user input operation. The user input operation may be a voice input, a touch input, a mouse input, or a keyboard input, etc., which is not limited by the disclosure. For example, the user may activate the video conferencing system 10 to execute the anti-interference function by pressing a specific function key. The processor 130 may set a certain previous video frame as the reference video frame in response to receiving the trigger operation, and classify a reference image object in the reference video frame as a non-interruption object. In addition, the operation content of using the deep learning model to detect the reference image object in the reference video frame is similar to the operation content of using the deep learning model to detect the first image object in the first video frame in the video stream, and reference may be made to the description of the foregoing embodiments.

In Step S404, the processor 130 uses the deep learning model to detect the at least one first image object in the first video frame in the video stream. In Step S405, the processor 130 determines whether the at least one first image object is an interruption object. In the embodiment, the Step S405 may be implemented as Steps S4051 to S4053.

In Step S4051, the processor 130 may determine whether the at least one first image object is an interruption object by comparing the at least one first image object in the first video frame with the at least one reference image object in the reference video frame. In an embodiment, the processor 130 may determine whether the first image object in the first video frame corresponds to the reference image object in the reference video frame according to the object classification result, and an image position of the reference image object and the object classification result and an image position of the first image object. That is, whether the first image object and the reference image object correspond to the same real scene object. Based on the guideline that the reference image object in the reference video frame is classified as the non-interruption object, if the processor 130 finds that a certain first image object does not correspond to the reference image object, it may determine that this first image object is a newly present interruption object.

Therefore, in Step S4052, the processor 130 determines that the at least one first image object is the interruption object in response to the at least one first image object not corresponding to the at least one reference image object. In Step S4053, the processor 130 determines that the at least one first image object is not the interruption object in response to the at least one first image object corresponding to the at least one reference image object. For example, the reference video frame captured before receiving the trigger operation includes the reference image object of two conference participants, then the first image object corresponding to the two conference participants in the first video frame will not be determined to be the interruption object by the processor 130. In Step S406, the processor 130 removes the at least one first image object from the first video frame in response to the at least one first image object being determined to be the interruption object.

Figure 5:
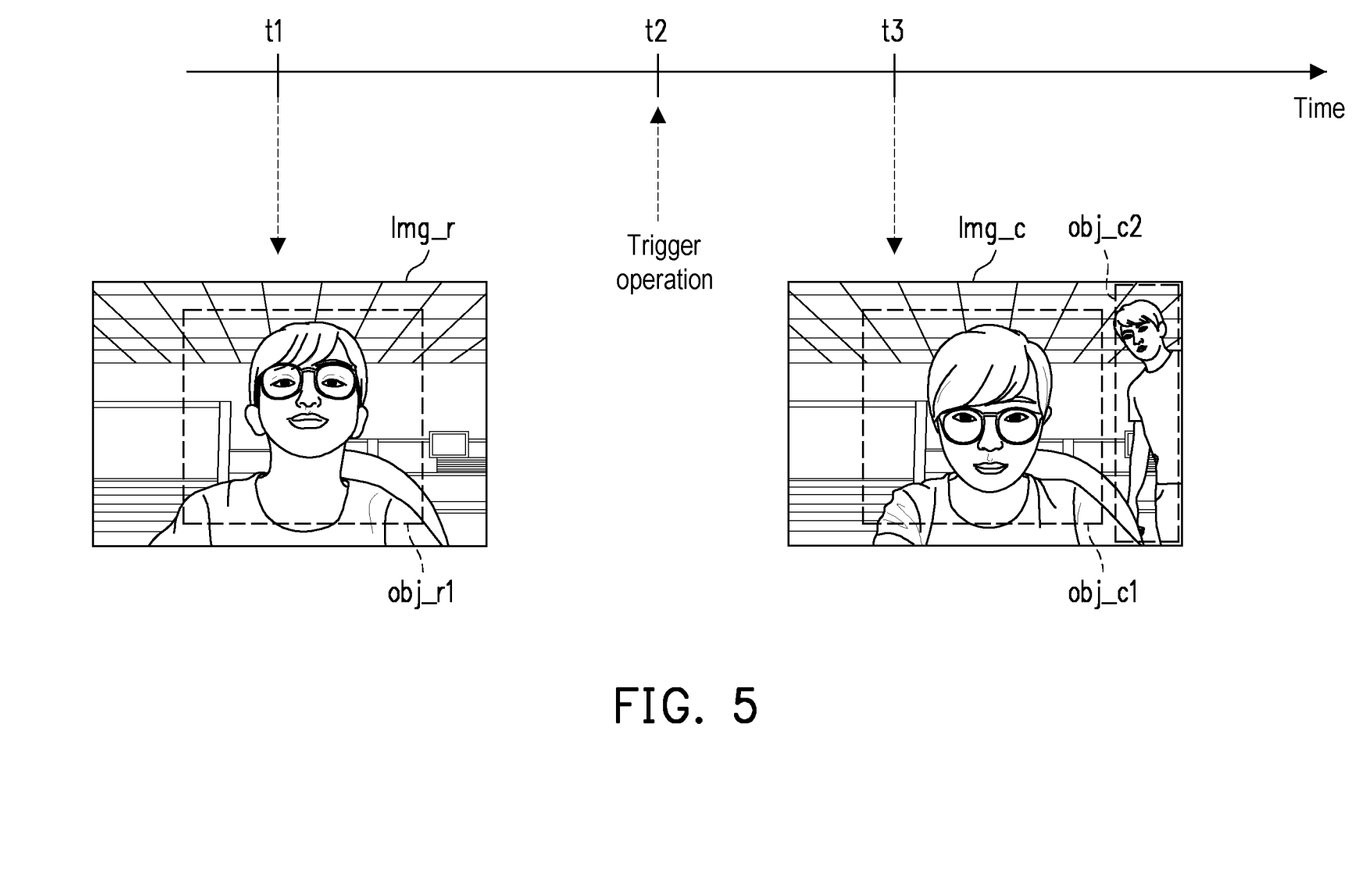
FIG. 5 is a schematic diagram of comparing video frames to detect an interruption object according to an embodiment of the disclosure.

FIG. 5 is a schematic diagram of comparing video frames to detect an interruption object according to an embodiment of the disclosure. With reference to FIG. 5, the processor 130 may decide on a basic video frame Img_r captured at a time point t1 in response to receiving the trigger operation at a time point t2. For example, the basic video frame Img_r may be a video frame captured 2 seconds before the trigger operation. The processor 130 may detect a reference image object Obj_r1 from the basic video frame Img_r. Then, the processor 130 may obtain a first video frame Img_c captured at a time point t3, and detect two first image objects Obj_c1 and Obj_c2 from the first video frame Img_c. The processor 130 may determine that the first image object Obj_c1 is not the interruption object in response to the first image object Obj_c1 being determined to be corresponding to the reference image object Obj_r1. The processor 130 may determine that the first image object Obj_c2 is the interruption object in response to the first image object Obj_c2 being determined to not be corresponding to any reference image object. Therefore, the processor 130 may first remove the first image object Obj_c2 from the first video frame Img_c, and then provide the processed video frame that does not include the first image object Obj_c2 to the other conference participants.

Figure 6:
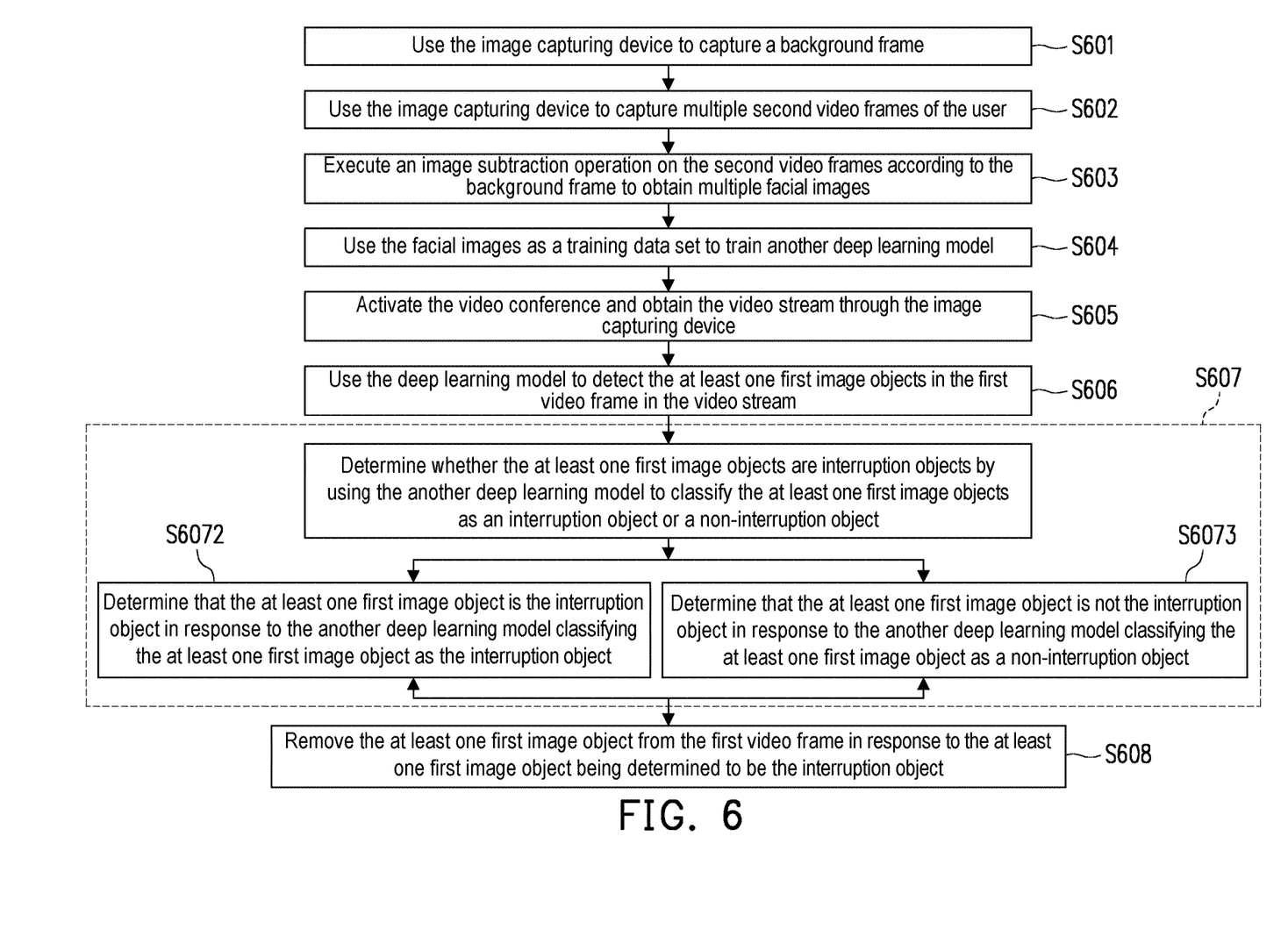
FIG. 6 is a flowchart of a method of removing an interruption according to an embodiment of the disclosure.
Figure 7:
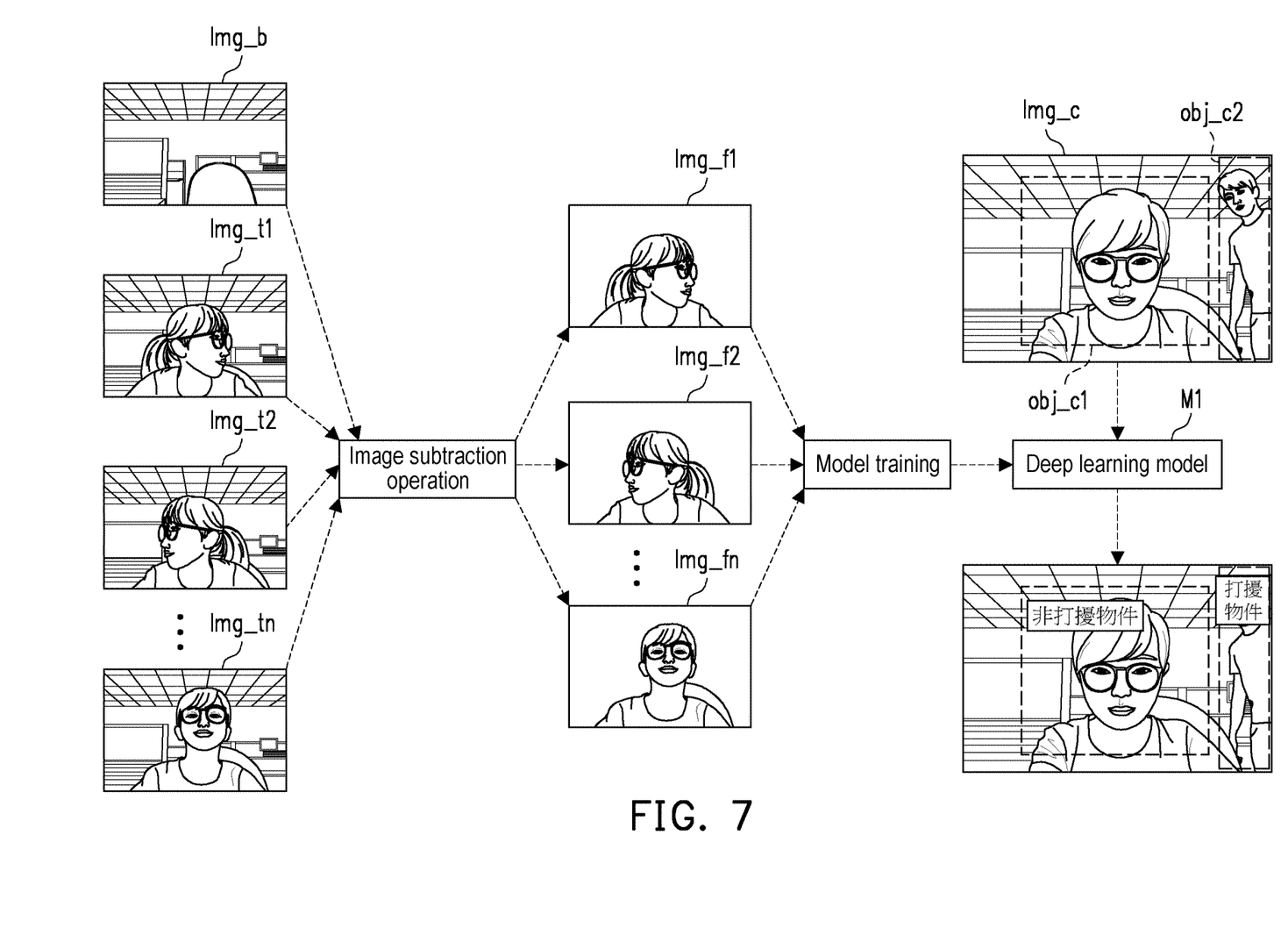
FIG. 7 is a schematic diagram of using a deep learning model to detect an interruption object according to an embodiment of the disclosure.

FIG. 6 is a flowchart of a method of removing an interruption according to an embodiment of the disclosure. With reference to FIG. 6, the method according to this embodiment is applicable to the video conferencing system 10 of the above-mentioned embodiment. Detailed steps of this embodiment are described in conjunction with the various components in the video conferencing system 10. In addition, for a clearer description, reference is made to FIGS. 6 and 7 concurrently. FIG. 7 is a schematic diagram of using a deep learning model to detecting an interruption object according to an embodiment of the disclosure.

In Step S601, the processor 130 uses the image capturing device 140 to capture the background frame Img_b. The background frame Img_b includes a background of the user during the video conference. In some embodiments, the background frame Img_b may be a frame that is shot in advance when the video conference starts. For example, a first frame 210 may be a video frame that is shot 5 seconds before activating the video conference, but the disclosure is not limited thereto.

In Step S602, the processor 130 uses the image capturing device 140 to capture multiple second video frames Img_t1 to Img_tn of the user. The second video frames Img_t1 to Img_tn may be video frames shot before activating the video conference, or video frames shot during the video conference. The second video frames Img_t1 to Img_tn include images of the user.

In Step S603, the processor 130 executes an image subtraction operation on the second video frames Img_t1 to Img_tn according to the background frame Img_b to obtain multiple facial images Img_f1 to Img_fn. The processor 130 may subtract the background frame Img_b from the second video frames Img_t1 to Img_tn one by one according to a background subtraction method to obtain the multiple facial images Img_f1 to Img_fn.

In Step S604, the processor 130 uses the facial images Img_f1 to Img_fn as a training data set to train another deep learning model M1. Here, the processor 130 will use the training data set to train an image classifier. The image classifier is an image identification model based on a deep learning algorithm. The deep learning model M1 trained in the Step S604 is configured to classify a model input image object as an interruption object or a non-interruption object. In some embodiments, the image classifier may be based on a Convolutional Neural Network (CNN), or other deep learning algorithms. More specifically, after planning the convolutional neural network architecture of the deep learning model M1, classification solution information of the facial images Img_f1 to Img_fn and each of the facial images Img_f1 to Img_fn must be used to decide on weight information in the deep learning model M1, so as to train the deep learning model M1. For example, the classification solution information of the facial images Img_f1 to Img_fn may respectively be the non-interruption objects and be marked as a classification result "1".

In Step S605, the processor 130 activates the video conference and obtains the video stream through the image capturing device 140. In Step S606, the processor 130 uses the deep learning model to detect the at least one first image objects Obj_c1 and Obj_c2 in the first video frame Img_c in the video stream. The deep learning model in the Step S606 and the deep learning model M1 are different models, and in the Step S606, the deep learning model is one configured to carry out object detection. In Step S607, the processor 130 determines whether the at least one first image objects Obj_c1 and Obj_c2 are interruption objects. In the embodiment, the Step S607 may be implemented as Steps S6071 to S6073.

In Step S6071, the processor 130 determines whether the at least one first image objects Obj_c1 and Obj_c2 are interruption objects by using the another deep learning model M1 to classify the at least one first image objects Obj_c1 and Obj_c2 as an interruption object or a non-interruption object. In other words, the processor 130 may use the deep learning model M1 trained in the Step S604 to identify whether each of the first image objects Obj_c1 and Obj_c2 are interruption objects. For example, in some embodiments, the processor 130 may use the deep learning model M1 to divide the first image objects Obj_c1 and Obj_c2 into two classification results of "1" or "0". If the classification result is "1", it means that the model input image object is a facial image of the user. If the classification result is "0", it means that the model input image object is not a facial image of the user.

Therefore, in Step S6072, the processor 130 determines that the at least one first image object Obj_c2 is the interruption object in response to the another deep learning model M1 classifying the at least one first image object Obj_c2 as the interruption object. In Step S6073, the processor 130 determines that the at least one first image object Obj_c1 is not the interruption object in response to the another deep learning model M1 classifying the at least one first image object Obj_c1 as the non-interruption object.

In Step S608, the processor 130 removes the at least one first image object Obj_c2 from the first video frame in response to the at least one first image object Obj_c2 being determined to be the interruption object. After that, the processor 130 may first remove the first image object Obj_c2 from the first video frame Img_c, and then provide the processed video frame that does not include the first image object Obj_c2 to the other conference participants.

Figure 8:
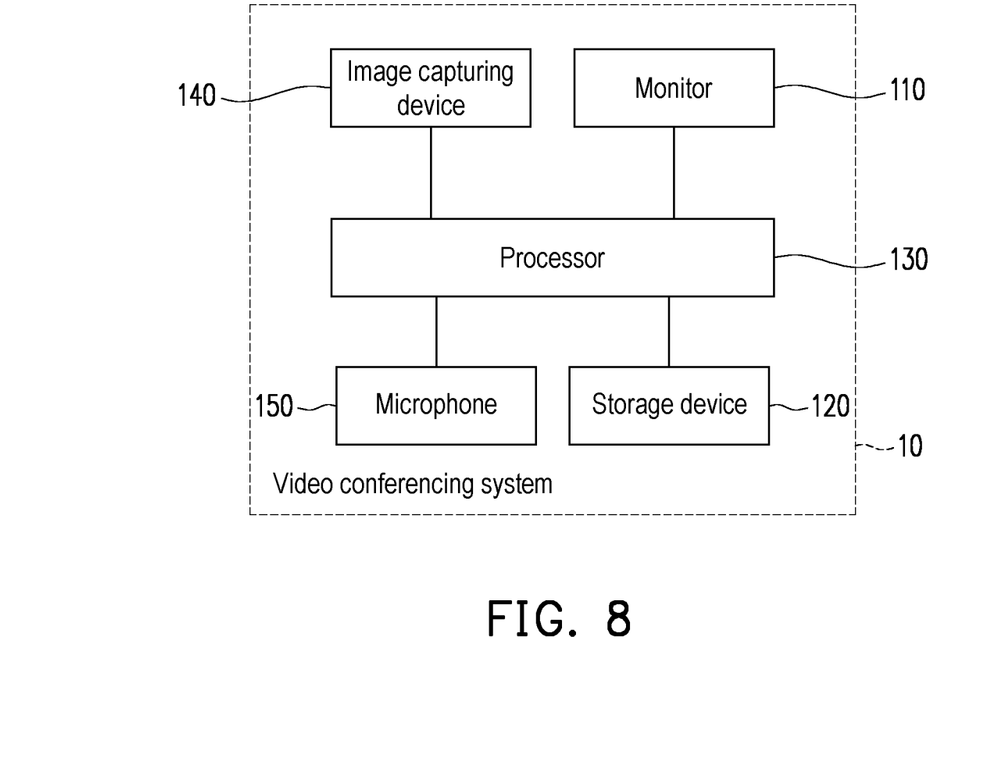
FIG. 8 is a block diagram of a video conferencing system according to another embodiment of the disclosure.

FIG. 8 is a block diagram of a video conferencing system according to another embodiment of the disclosure. With reference to FIG. 8, in an embodiment, the video conferencing system 10 further includes a microphone 150 coupled to the processor 130. The microphone 150 is configured to receive a sound signal. In some embodiments, the microphone 150 may be a built-in microphone embedded in an electronic device such as a notebook computer, a desktop computer, a smart phone, and a tablet computer. In other embodiments, the microphone 150 may be an externally connected microphone independent of the computer system, but the disclosure is not limited thereto.

Figure 9:
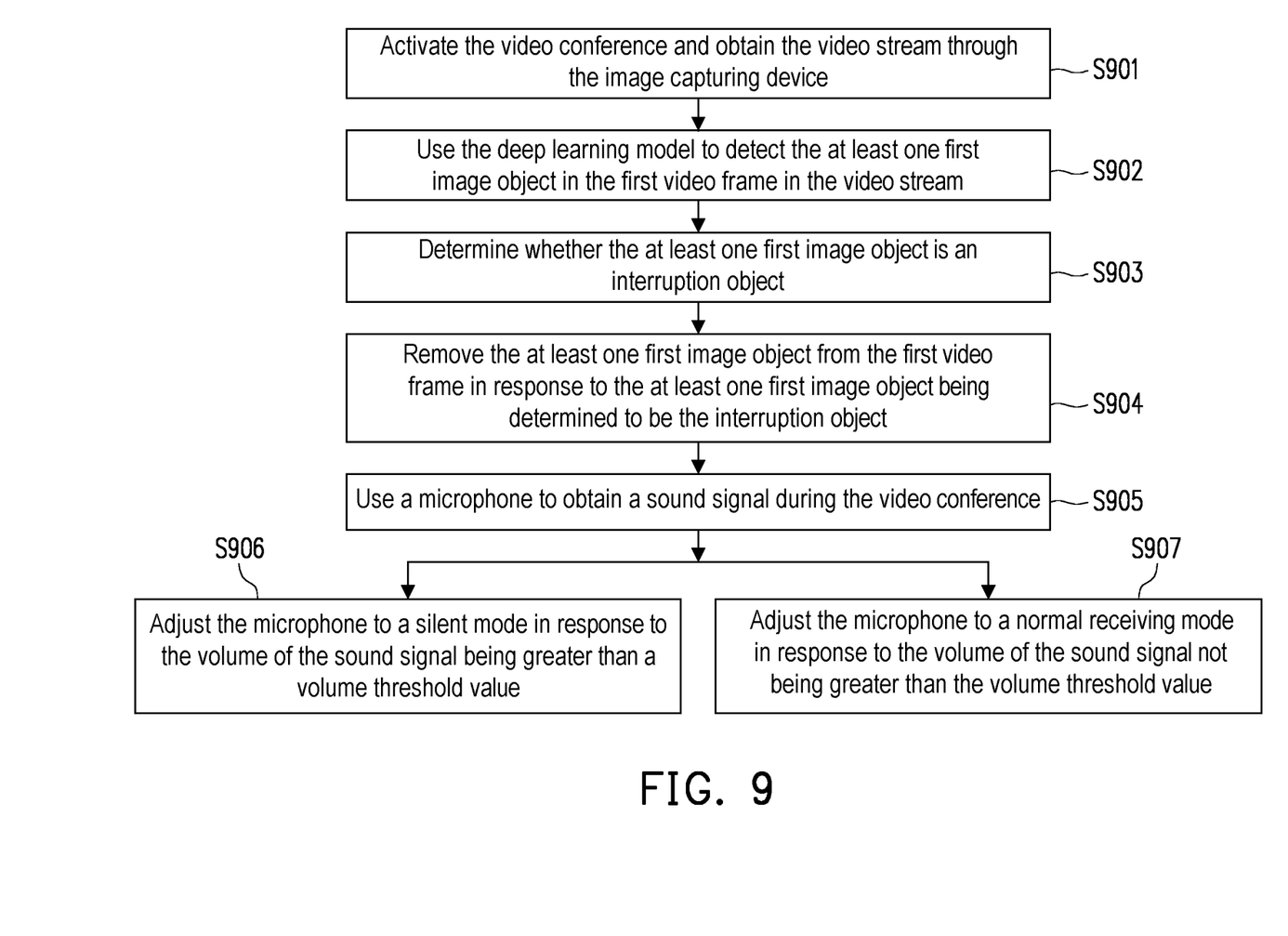
FIG. 9 is a flowchart of a method of removing an interruption according to an embodiment of the disclosure.

FIG. 9 is a flowchart of a method of removing an interruption according to an embodiment of the disclosure. With reference to FIG. 9, the method according to this embodiment is applicable to the video conferencing system 10 of the above-mentioned embodiment. Detailed steps of this embodiment are described in conjunction with elements in the video conferencing system 10 in FIG. 8 as follows.

In Step S901, the processor 130 activates the video conference and obtains the video stream through the image capturing device 140. In Step S902, the processor 130 uses the deep learning model to detect the at least one first image object in the first video frame in the video stream. In Step S903, the processor 130 determines whether the at least one first image object is an interruption object. In Step S904, the processor 130 removes the at least one first image object from the first video frame in response to the at least one first image object being determined to be the interruption object. Detailed content of implementing the above-mentioned step has been described in the foregoing embodiment, which will not be reiterated here.

In Step S905, the processor 130 uses the microphone 150 to obtain the sound signal during the video conference. Specifically, the sound signal received by the microphone 150 may include sound of a speech by the user and sound of the surroundings of the user, such as howling by a pet, speeches of other people, or other sudden sound, but the disclosure is not limited thereto. Under normal circumstances, a volume of the sound signal inputted by the user to the microphone will not change drastically and will be less than a volume threshold value. Therefore, if the processor 130 determines that the volume of the sound signal exceeds the volume threshold value, then it may infer that there is an interference sound.

In Step S906, the processor 130 adjusts the microphone 150 to a silent mode in response to the volume of the sound signal being greater than the volume threshold value. In Step S907, the processor 130 adjusts the microphone 150 to a normal receiving mode in response to the volume of the sound signal not being greater than the volume threshold value. That is, the processor 130 continuously determines whether the volume of the sound signal received by the microphone 150 exceeds the volume threshold value. The volume threshold value may be a preset value or a statistical value decided by the processor 130 according to a volume record. For example, the processor 130 may determine whether a volume decibel value (dB) of the sound signal is greater than the volume threshold value. In an embodiment, the processor 130 may switch the microphone 150 from the silent mode to the normal receiving mode in response to the volume of the sound signal changing from being greater than the volume threshold value to being less than the volume threshold value.

In an embodiment, the volume threshold may be decided according to the volume record in a preset time period. The processor 130 may record the volume of the sound signal received by the microphone 150 in the preset time period, and decide on the volume threshold value according to the volume record. In an embodiment, the processor 130 may perform a statistical calculation on the volume record in the preset time period to obtain the statistical value, and use the statistical value as the volume threshold value. The above-mentioned statistics may be in quartiles and so on. In addition, the embodiment of the disclosure does not limit a length of the preset time period, which may be set according to actual needs.

For example, the processor 130 samples and records the volume decibel value (dB) every second, and continues to store a total of 600 records of volume in the last 10 minutes. For example, the volume record may be as shown in Table 1 below:

TABLE 1

| Time (hour:minute:second) | Volume (dB) |
|---|---|
| 10:43:21 | 61.2 |
| 10:43:22 | 59.8 |
| ... | |
| 11:43:21 | 62.4 |

Then, the processor 130 may determine the volume threshold value according to the volume record in Table 1. For example, the processor 130 may obtain a third quartile of the volume record in Table 1 to be 61.9 (dB), and use the third quartile of 61.9 (dB) as the volume threshold value.

In summary, according to the embodiments of the disclosure, when the user is in a video conference, the video conferencing system may automatically detect the interference sound and the interruption object in the video frame, and automatically filter out the interference sound and the image object that is the interruption object. Based on this, the other conference participants will not be severely affected by the interference sound or the interruption object, therefore preventing halting of the video conference. In this way, the embodiments of the disclosure allow the user to remove the interruption of the video conference in real time during the video conference, so that the video conference can proceed fluently and smoothly.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A method of removing an interruption, applicable to a video conferencing system, the method comprising:
   activating a video conference and obtaining a video stream through an image capturing device;
   using a deep learning model to detect at least one first image object in a first video frame in the video stream;
   determining whether the at least one first image object is an interruption object; and
   removing the at least one first image object from the first video frame in response to the at least one first image object being determined to be the interruption object,
   wherein determination of whether the at least one first image object is the interruption object comprises:
      determining whether the at least one first image object is the interruption object by comparing the at least one first image object in the first video frame with at least one reference image object in a reference video frame;
      determining that the at least one first image object is the interruption object in response to the at least one first image object not corresponding to the at least one reference image object; and
      determining that the at least one first image object is not the interruption object in response to the at least one first image object corresponding to the at least one reference image object.

2. The method of removing the interruption according to claim 1, wherein before determining whether the at least one first image object is the interruption object, the method further comprises:
   selecting the reference video frame from the video stream in response to a trigger operation; and
   using the deep learning model to detect the at least one reference image object in the reference video frame.

3. The method of removing the interruption according to claim 1, wherein determination of whether the at least one first image object is the interruption object comprises:
   determining whether the at least one first image object is the interruption object by using another deep learning model to classify the at least one first image object as the interruption object or a non-interruption object;
   determining that the at least one first image object is the interruption object in response to the at least one first image object being classified as the interruption object by the another deep learning model; and
   determining that the at least one first image object is the non-interruption object in response to the at least one first image object being classified as the non-interruption object by the another deep learning model.

4. The method of removing the interruption according to claim 3, wherein before determining whether the at least one first image object is the interruption object, the method further comprises:
   using the image capturing device to capture a background frame;
   using the image capturing device to capture a plurality of second video frames of a user;
   executing an image subtraction operation on the second video frames according to the background frame to obtain a plurality of facial images; and
   using the facial images as a training data set to train the another deep learning model.

5. The method of removing the interruption according to claim 1, wherein removal of the interruption object from the first video frame comprises:
   using a first region of a third video frame to replace a second region in the first video frame, wherein the second region comprises the interruption object.

6. The method of removing the interruption according to claim 1, wherein the method further comprises:
   using a microphone to obtain a sound signal during the video conference;
   adjusting the microphone to a silent mode in response to a volume of the sound signal being greater than a volume threshold value; and
   adjusting the microphone to a normal receiving mode in response to the volume of the sound signal being less than the volume threshold value.

7. The method of removing the interruption according to claim 6, wherein the method further comprises:
  recording a volume record of the sound signal in a preset time period; and
  determining the volume threshold value according to the volume record.

8. A video conferencing system, comprising:
  a monitor;
  an image capturing device;
  a storage device, recording a plurality of instructions; and
  a processor, coupled to the monitor, the image capturing device and the storage device, and is configured to
    activate a video conference and obtaining a video stream through the image capturing device;
    use a deep learning model to detect at least one first image object in a first video frame in the video stream;
    determine whether the at least one first image object is an interruption object; and
    remove the at least one first image object from the first video frame in response to the at least one first image object being determined to be the interruption object,
  wherein the processor is further configured to
  determine whether the at least one first image object is the interruption object by comparing the at least one first image object in the first video frame with at least one reference image object in a reference video frame;
  determine that the at least one first image object is the interruption object in response to the at least one first image object not corresponding to the at least one reference image object; and
    determine that the at least one first image object is not the interruption object in response to the at least one first image object corresponding to the at least one reference image object.

9. The video conferencing system according to claim 8, wherein the processor is further configured to
  select the reference video frame from the video stream in response to a trigger operation; and
  use the deep learning model to detect the at least one reference image object in the reference video frame.

10. The video conferencing system according to claim 8, wherein the processor is further configured to
  determine whether the at least one first image object is the interruption object by using another deep learning model to classify the at least one first image object as the interruption object or a non-interruption object;
  determine that the at least one first image object is the interruption object in response to the at least one first image object being classified as the interruption object by the another deep learning model; and
  determine that the at least one first image object is the non-interruption object in response to the at least one first image object being classified as the non-interruption object by the another deep learning model.

11. The video conferencing system according to claim 10, wherein the processor is further configured to
  use the image capturing device to capture a background frame;
  use the image capturing device to capture a plurality of second video frames of a user;
  execute an image subtraction operation on the second video frames according to the background frame to obtain a plurality of facial images; and
  use the facial images as a training data set to train the another deep learning model.

12. The video conferencing system according to claim 8, wherein the processor is further configured to
  using a first region of a background frame to replace a second region in the first video frame, wherein the second region comprises the interruption object.

13. The video conferencing system according to claim 8, wherein the video conferencing system further comprises a microphone coupled to the processor, and the processor is further configured to
  using the microphone to obtain a sound signal during the video conference;
  adjusting the microphone to a silent mode in response to a volume of the sound signal being greater than a volume threshold value; and
  adjusting the microphone to a normal receiving mode in response to the volume of the sound signal being less than the volume threshold value.

14. The video conferencing system according to claim 13, wherein the processor is further configured to
  record a volume record of the sound signal in a preset time period; and
  determine the volume threshold value according to the volume record.

15. A method of removing an interruption, applicable to a video conferencing system, the method comprising:
  activating a video conference and obtaining a video stream through an image capturing device;
  using a deep learning model to detect at least one first image object in a first video frame in the video stream;
  determining whether the at least one first image object is an interruption object; and
  removing the at least one first image object from the first video frame in response to the at least one first image object being determined to be the interruption object,
  wherein the method further comprises:
  using a microphone to obtain a sound signal during the video conference;
  recording a volume record of the sound signal in a preset time period;
  determining a volume threshold value according to the volume record;
  adjusting the microphone to a silent mode in response to a volume of the sound signal being greater than the volume threshold value; and
  adjusting the microphone to a normal receiving mode in response to the volume of the sound signal being less than the volume threshold value.

* * * * *